United States Patent [19]

Mengel

[11] Patent Number: 5,580,211
[45] Date of Patent: Dec. 3, 1996

[54] CONTAINER TRANSPORTATION SYSTEM

[76] Inventor: William F. Mengel, 521 Elm St., Wisconsin Rapids, Wis. 54494

[21] Appl. No.: 312,040

[22] Filed: Sep. 26, 1994

[51] Int. Cl.$^6$ .............................. B65G 67/24; B60P 1/16; E01C 23/00
[52] U.S. Cl. .................. 414/786; 414/339; 414/471; 414/501; 298/11; 298/22 R; 404/79
[58] Field of Search ..................... 414/339, 498, 414/501, 471, 786; 298/22 R, 11; 404/79, 95

[56] References Cited

U.S. PATENT DOCUMENTS

| 1,066,772 | 7/1913 | Williams . | |
|---|---|---|---|
| 2,045,566 | 6/1936 | Berg | 414/339 |
| 2,478,658 | 8/1949 | Harbers | 414/339 |
| 2,494,735 | 1/1950 | Ambarcumian | 414/339 |
| 2,527,369 | 10/1950 | Meyer | 298/11 X |
| 2,631,885 | 3/1953 | Ault . | |
| 2,986,408 | 5/1961 | Black . | |
| 3,007,588 | 11/1961 | Cull | 414/339 |
| 3,083,850 | 4/1963 | Owen | 298/11 X |
| 3,163,306 | 12/1964 | Bennett . | |
| 3,420,390 | 1/1969 | Taggart | 414/339 |
| 3,486,645 | 12/1969 | Hearn | 414/339 |
| 3,504,814 | 4/1970 | McCleary . | |
| 3,601,447 | 8/1971 | Kelley | 298/22 R |
| 3,625,489 | 12/1971 | Weaver . | |
| 3,735,884 | 5/1973 | Klett . | |
| 3,938,678 | 2/1976 | Kern . | |
| 4,203,697 | 5/1980 | Cayton . | |
| 4,231,695 | 11/1980 | Weston . | |
| 4,695,186 | 9/1987 | King . | |
| 4,755,089 | 7/1988 | Ellgass . | |
| 4,820,078 | 4/1989 | Brocius . | |
| 4,915,567 | 4/1990 | Ellingsen | 414/498 X |
| 4,944,632 | 7/1990 | Dillingham . | |
| 4,978,068 | 12/1990 | Eldridge . | |
| 5,120,217 | 6/1992 | O'Brien . | |
| 5,291,876 | 3/1994 | Milstead . | |

FOREIGN PATENT DOCUMENTS

| 2909070 | 9/1980 | Germany | 298/11 |
|---|---|---|---|
| 1597332 | 10/1990 | U.S.S.R. | 404/79 |

OTHER PUBLICATIONS

Brochure—Dockloader, 1 page, date unknown.
Brochure—Stellar Shuttle, Stellar Industries Inc.; Garner, IA, 3 pages, date unknown.

Primary Examiner—Karen Merritt
Assistant Examiner—Stephen Gordon
Attorney, Agent, or Firm—LaValle D. Ptak

[57] ABSTRACT

A transportation system is adapted for transporting and removing roll on/roll off containers from a trailer surface. A tractor having a fifth wheel is used to tow the trailer. The tractor carries a supplemental platform, which is placed over the fifth wheel area to permit transfer of a container from the trailer onto the platform of the towing tractor for transportation of the container to a delivery site. The container and tractor also include mating members to permit raising one end of the container relative to the other to facilitate dumping of the contents from the container while it is carried on the supplemental platform on the tractor. A specific form of container, particularly suitable for use in the transportation system, is a double walled, insulated container for carrying hot mix asphalt.

10 Claims, 3 Drawing Sheets

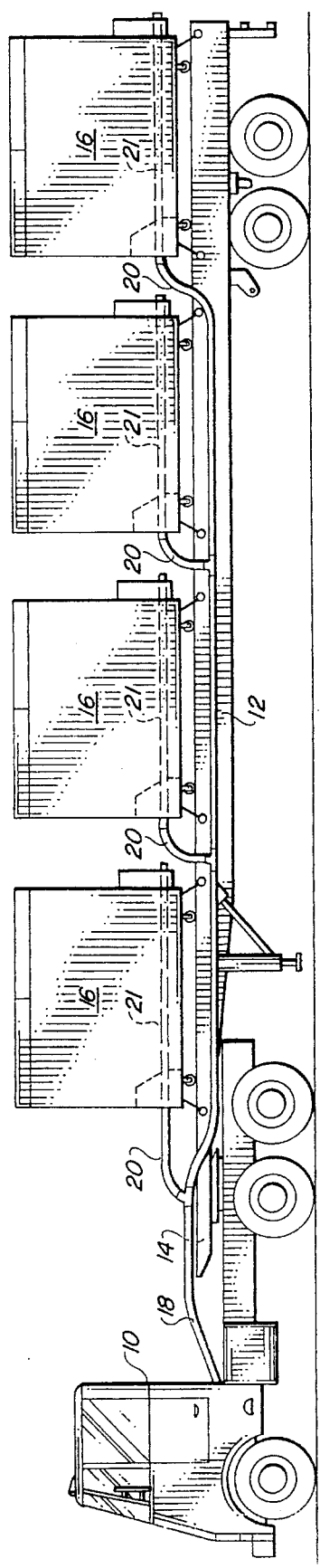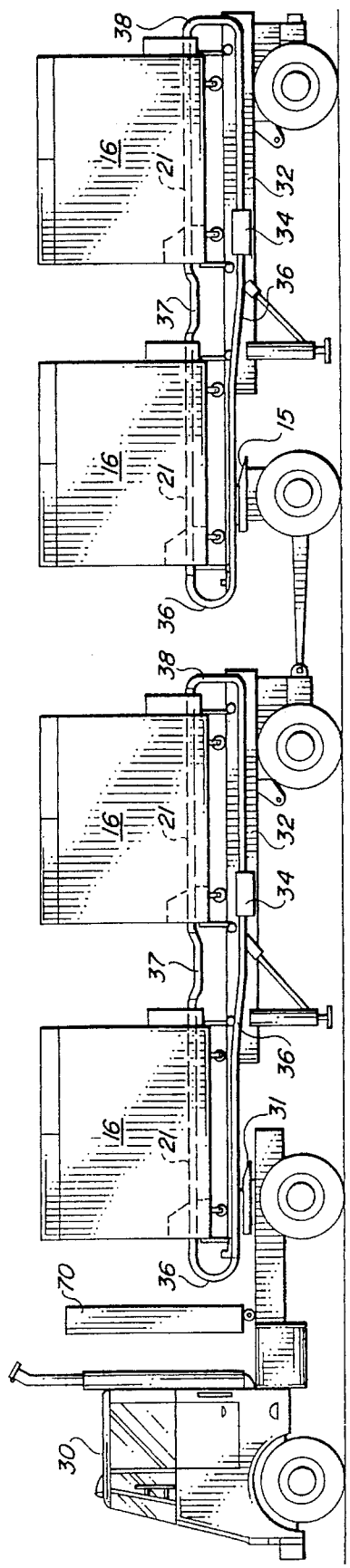

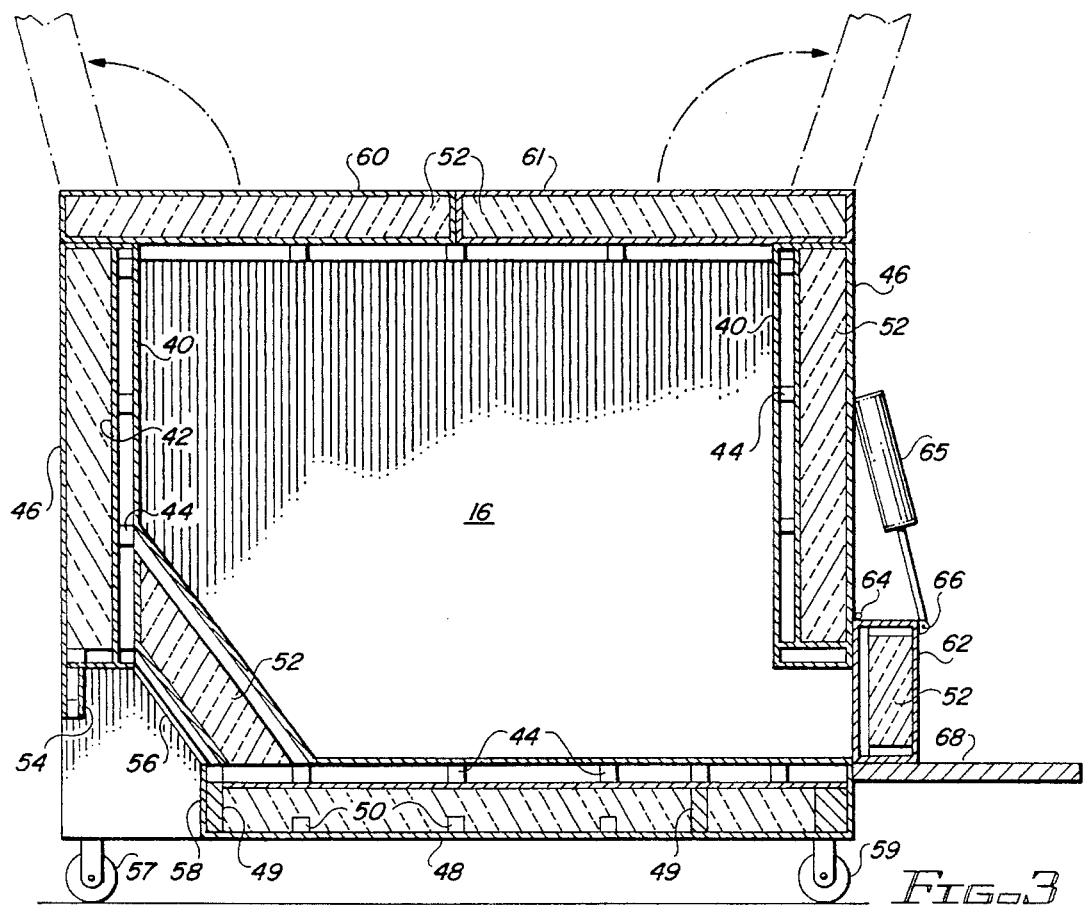
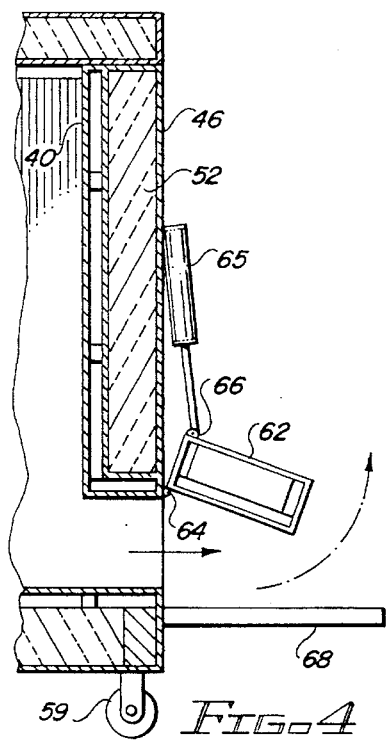
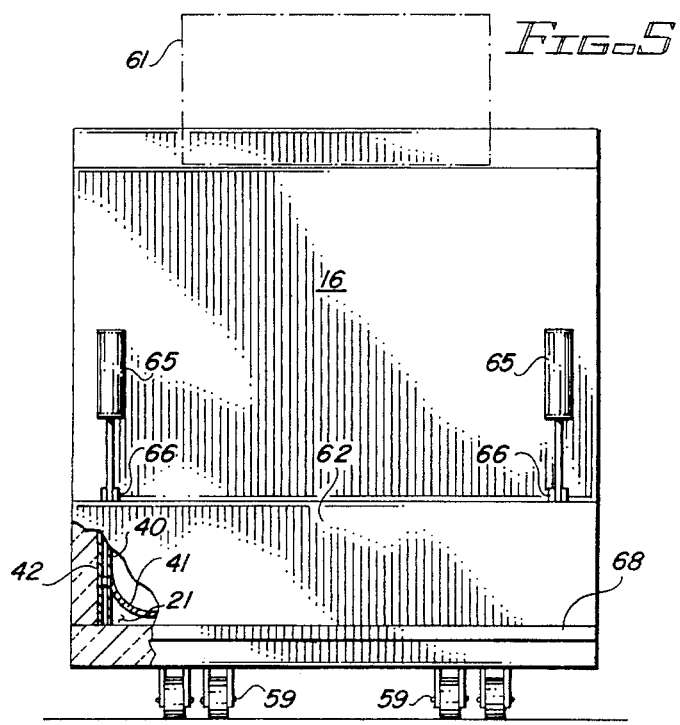

CONTAINER TRANSPORTATION SYSTEM

BACKGROUND

Systems for transporting cargo in transferable containers, carried on flatbed trailers towed by a tractor, are becoming increasingly popular. Such containers, for example, are particularly useful for "partial loads" where two or more containers may be carried on the same trailer destined for different destinations. To further increase the utilization of container/trailer transportation systems, containers have been designed with rollers or wheels on the bottom to facilitate loading and unloading of the containers from a trailer.

Three patents which disclose container systems permitting the transfer of container loads to and from either end of a semi-trailer onto a loading dock or onto another truck are the U.S. patents to Ault U.S. Pat. No. 2,631,885; Black U.S. Pat. No. 2,986,408; and Cayton U.S. Pat. No. 4,203,697. The Ault patent is directed to a container transfer system which uses pivot rails on the trailer to permit loading and unloading of pallets from either side of the trailer, or from either end. The Black patent is directed to a reversible semi-trailer construction for carrying two containers, which may be rolled onto and removed from either end of the trailer.

The patent to Cayton is directed to a trailer which is to be parked near an agricultural field. Pallets containing agricultural products are loaded onto a small transfer truck, which then backs up to either end of the trailer and rolls the pallets onto the trailer. The trailer may be made of a greater length than the length of the bed of the transfer vehicle; so that multiple pallets may be transferred from the smaller vehicle onto the trailer.

Two other patents directed to plural unit trailers having somewhat complex configurations are Bennett U.S. Pat. No. 3,163,306 and McCleary U.S. No. 3,504,814. The devices of both of these patents permit loading and unloading from either end of the trailer.

Another industry which has been unrelated to container transportation systems is the hot mix asphalt (HMA) industry. This industry is composed of several entities. The heavy tar-like residue, which remains after the production of gasoline and diesel fuel, is marketed in several grades and sold as what is called "bitumen" to hot mix asphalt producers (HMAP). The HMAP store the bitumen in large storage tanks and maintain the temperature of the bitumen at approximately 300° to keep it in a liquid state. Whenever bitumen is allowed to cool, it solidifies and is not workable.

The producer has a hot mix plant (HMP) which includes aggregate storage facilities, conveyors, aggregate dryer drums, aggregate use bins with weighing devices to proportion different aggregate gradations, and the like. The producer selects the desired HMA formula and sends the desired proportions to a heated drum and dries the aggregate to the desired moisture content. Pugmills or other devices are used to mix the hot aggregate with asphalt cement (a binder) and bitumen into a well blended, homogenous mass. The product is called hot mix asphalt (HMA); and the producer markets HMA in several different formulas or grades.

Asphaltic cement, the binder in HMA, is a thermoplastic material with a characteristic of being very workable at 300° Fahrenheit and as hard as concrete at 100° Fahrenheit. Clearly, the workability of this material varies with temperature. At the job site, the placing crew typically likes to have the HMA material at close to 300° Fahrenheit for workable paving. A typical HMA production facility, however, does not like to exceed 310° to 320° Fahrenheit, because light end hydrocarbons in the form of smoke and vapors become abundant at these higher temperatures. In addition, the combination of high temperatures and exposure to oxygen causes oxidation (hardening) or rapid aging of the asphaltic cement. Hot mix asphalt is a flexible pavement; and as long as it remains so, it is serviceable. As asphaltic pavement ages or hardens, it becomes brittle, cracks, and ultimately no longer is serviceable as a pavement structure. Consequently, any premature aging or hardening (oxidation) of asphaltic cement results in shorter service life of the asphalt pavements.

At HMA production facilities, care is given to protecting the HMA from rapid high temperature aging. Storage facilities now are available which are heated, insulated, sealed airtight, and in some cases, held under slight pressure from an inert gas generator, to avoid any oxygen exposure to the HMA as it is being stored. Storage facilities of this type have been approved by various government agencies to store HMA for several days. Typically, however, HMA is stored in large storage tanks constructed in this manner at the production facility, and then is transferred from the tanks to the dump trucks for transportation to the job site.

The different HMA products are stored in separate storage bins. Contractors order the formula they desire. Typically, hot HMA is weighed into dump truck and the HMA is delivered to the construction site. At the construction site, the HMA is transferred or dumped from the delivery truck into a paver, which spreads the HMA to the desired width and thickness. The HMA then is compacted to a dense mass by using heavy rollers. After the HMA cools to the ambient temperature, it becomes very hard and makes an excellent surface for highway pavements, parking lots, driveways, walking paths, and the like.

In cold climates, typically starting around Labor Day, it is difficult to place an HMA finish or top course, since the present methods of transporting and placing HMA allow the HMA to cool, where it becomes difficult to obtain an ideal paving surface. Since hot HMA cools relatively rapidly after it is placed in a delivery dump truck, the hot mix plant typically is located a relatively short distance from the application site. Presently, permanent hot mix asphalt plants economically service an area with a radius of approximately 25 miles. Beyond that radius, paving areas develop which may be considered "soft spots" because permanent hot mix asphalt plants typically are not located close enough together to cover all areas of the country. This has created a market for portable hot mix asphalt plants.

Whenever a contractor requires a large order of HMA (typically several thousand tons), a portable plant may be set up by the producer near the distribution site; so that unnecessary cooling of the HMA between the production site and the distribution site does not take place. This is done for major highway paving jobs, and the like. For some locations, however, which fall into the described "soft spots", zoning and aggregate availability limitations may preclude setting up a portable plant for even large jobs. In any event, customers who are located in the "soft areas" generally pay a higher rate for HMA, and frequently receive material which must be reheated at the distribution site, or which is in risk of being cooled to a temperature where application becomes difficult.

Another disadvantage of the typical HMA production and distribution system is that the material must be produced and heated to its application temperature only a relatively short time prior to its application at the job site. Consequently, production at an HMA plant typically takes place in the early morning hours; and the dump trucks which distribute the HMA material from the plant to the job site travel back and forth between the plant and the job site. If heavily traveled highways exist between the plant and the job site, the transportation of HMA material from the plant to the job site and the return trip of the empty truck can take undue amounts of time. This is particularly true if delivery is desired during the typical "rush hour" traffic congestion, which takes place in and around most large cities in the morning and in the late afternoon.

The size of the HMA industry in the United States is approximately 400 million to 500 million tons of HMA annually. At present market prices, this constitutes a nearly twenty billion dollar annual industry. In the United States, approximately 75 percent to 85 percent of HMA is used in the construction of pavements in highways, streets and airports. The balance of the HMA produced is used in private work, civil projects, parking lots, driveways, etc. The foregoing discussion is directed primarily to the production and delivery of HMA to the large construction projects constituting highways, streets and airports. Small jobs are difficult to effectively service; and many of them are located in the "soft spots". Because of the small size of such jobs, it is not practical to set up a portable HMA plant at the job site. Consequently, the delivery and distribution of HMA to many small job sites is inefficient; and the quality of the delivered HMA frequently is less than desired.

Typically, HMA is transported to paving sites in open dump truck bodies. During cold weather, truck boxes for transporting HMA are insulated to the extent possible, and frequently are covered with a roll-out tarpaulin. As an effort to maintain the HMA at a desired temperature, a system disclosed in the U.S. patent to O'Brien U.S. Pat. No. 5,120,217 has been developed. This patent discloses a delivery unit for HMA material. The delivery unit is mounted on a trailer. The hopper of the unit has hydraulically operated doors for closing its top; and it incorporates a double walled construction, with the inner hoppers spaced from the outer walls of the container. Heated air is passed in the space between the inner and outer hoppers, and also through a double wall in the doors in the top, to exit over the material inside the hopper. This unit is designed to be dropped off at a construction site at the end of a working day. A heater then is operated overnight; so that the material is at the desired temperature by the next morning and is then ready for use.

Another effort to provide heating for the hopper or truck used to carry HMA is disclosed in the U.S. patent to Eldridge U.S. Pat. No. 4,978,068. This patent discloses the passage of exhaust gases of a vehicle between inner and outer chambers of a hopper for heating the contents of the hopper. A different approach for heating the contents of a hopper carried on a truck is disclosed in the U.S. patent to King U.S. Pat. No. 4,695,186. The hopper disclosed in this patent is permanently mounted on a truck. The hopper structure includes a space between the lower walls of the hopper and an additional plate in the truck. This space provides a chamber for a heat exchange from a heater located beneath the hopper to transfer heat to the material within the hopper.

The U.S. patent to Dillingham U.S. Pat. No. 4,944,632 also discloses the use of a double wall construction in a hopper for transporting asphalt repair materials from one place to another. The hopper is open at the top; but the heat source is located to supply heat to the space between the walls for heating the asphalt in the hopper.

Accordingly, it is desirable to provide an improved distribution system, particularly suited for the delivery and distribution of HMA, which overcomes the disadvantages of the prior art, which is simple and effective to execute, and which is reliable in operation.

SUMMARY OF THE INVENTION

It is an object of this invention to provide an improved transportation system.

It is another object of this invention to provide an improved container transportation system for delivery of containers to a job site and for facilitating the removal of containers from a transporting vehicle to a delivery vehicle.

It is an additional object of this invention to provide an improved delivery system for storing and protecting hot mix asphalt (HMA).

It is a further object of this invention to permit the transportation of HMA at off-peak traffic hours.

It is yet another object of this invention to provide a delivery system for HMA which permits storage of HMA at the job site to increase the efficiency of the paving application.

It is yet another object of this invention to provide an HMA transportation system utilizing smaller, lighter weight delivery containers at the paver location.

In accordance with a preferred embodiment of the invention, a transportation system includes a tractor with a fifth wheel for towing a trailer loaded with a roll on/roll off container on the load carrying surface of the trailer. The towing tractor carries a supplemental platform, which normally is held in a storage position when the trailer is being towed by the tractor. The supplemental platform is moved to a use position after the tractor is detached from the trailer. A lift device then is provided on the tractor for engaging a mating member on a container placed on the supplemental platform to lift one end of the container relative to the other to facilitate unloading of the container.

In a particular application of the system, a plurality of containers is provided for transporting heated materials, such as hot mix asphalt, from a production site to a job site. Each container comprises an outer shell spaced from an inner shell; and the space between the two shells is filled with insulation. After the container is emptied, it is returned to the transporting trailer, readying it for the return to the plant for refilling.

BRIEF DESCRIPTION OF THE DRAWINGS

FIG. 1 is a diagrammatic representation of a preferred embodiment of the invention;

FIG. 2 is a diagrammatic representation of another preferred embodiment of the invention;

FIG. 3 is a cross-sectional detail of a container used in the embodiments of FIGS. 1 and 2;

FIG. 4 is a partially cut away cross-sectional view of a portion of the embodiment shown in FIG. 3 illustrating a different operating position of some of the parts thereof;

FIG. 5 is an end view of the container shown in FIG. 3;

DETAILED DESCRIPTION

Figure 6A:
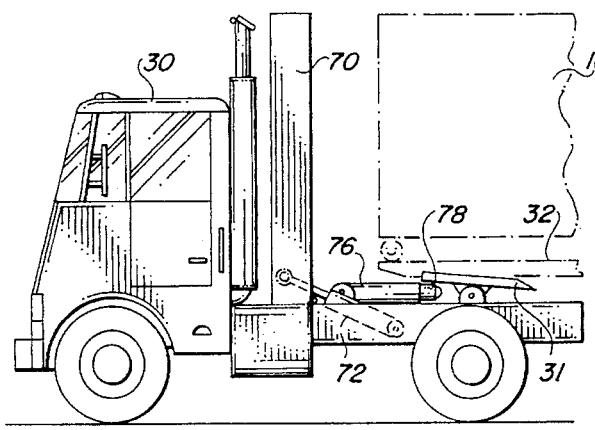
FIGS. 6A to 6E illustrate different stages in the operation of the embodiment of the invention shown in FIG. 2.

Reference now should be made to the drawings, in which the same reference numbers are used throughout the different figures to designate the same components. FIGS. 1 and 2 are directed to two different embodiments of a transporting system fop moving containers from a loading site to a delivery site.

FIG. 1 shows a tandem axle tractor 10 towing a flatbed trailer 12 attached to the tractor 10 through a standard fifth wheel connector 14. The flatbed trailer 12 has an upper load carrying surface on it, which may include spaced guide rails or channels or, depending upon the type of containers to be carried, the load carrying surface may be entirely flat. The trailer 12 of FIG. 1 may be a typical forty foot long flatbed trailer; and it is illustrated hauling four container boxes 16. The boxes 16 have an overall length of approximately eight feet, and typically are eight feet, 10 inches wide and six feet to seven feet high. Standard tie-down devices hold the containers in place during transit.

In the embodiment illustrated in FIG. 1, the containers 16 preferably are insulated containers for carrying hot mix asphalt (HMA) or any material that requires to be kept either hot or cold such as any liquid, fruits or vegetables, etc. In order to maintain the elevated temperature of the HMA within the containers 16, the exhaust from the tractor 10 is applied through an exhaust pipe 18 and coupled through couplers 20 to external pipe connections on each side of the container which lead to an internal air space 21 at the bottom of the container formed by the lower curved inner wall and the outer wall. The exhaust passes through the bottom of the container 16 and is discharged directly to the atmosphere through two bottom outlets (not shown). The heated air in this area 21 conducts heat upward to the contained air between the inner and outer wall and maintains the heat in the side and end walls.

When the tractor-trailer rig 10/12 arrives at the delivery destination, the containers 16 may be unloaded in any suitable manner. As illustrated in FIG. 1, the containers are on wheels or rollers; so that they may be pushed or pulled off the trailer 12 in any suitable manner. The design of the trailer 12 is such that when the trailer is unhitched from the tractor and the landing gear is lowered to place the trailer in its "parked" position, the containers 16 may be removed from the flat trailer bed from either end, that is, from the end which is attached to the towing tractor 10, or from the rear end (the right end, as shown in FIG. 1). When the containers 16 are used to transport HMA, the connector pipes 20 first are disconnected from the connections to the internal air spaces 21 of the containers 16 to permit unimpeded removal of the containers from the flatbed trailer 12.

After a container has been emptied, it then may be returned to the opposite end of the trailer 12, pushing the loaded containers 16 toward to the unloading end, so that the next container 16 may be removed. This sequence is repeated until all four of the containers 16 have been removed, unloaded and returned to the trailer 12. This type of operation is the one which is employed whenever the containers 16 are used to carry HMA. It should be noted, however, that containers 16 carrying various types of cargo may be employed with this system, and loaded and unloaded in this manner, as desired.

In FIG. 2, a tandem trailer arrangement is employed. In the transportation system of FIG. 2, a single axle tractor 30 pulls a first semi-trailer 32 through a fifth wheel hitch 31. As illustrated in FIG. 2, a fifth wheel assembly 15 is attached to the first trailer 32 for towing a second trailer 32. Each of the trailers 32 are capable of carrying two of the containers 16 of the size described above in conjunction with the embodiment of FIG. 1. As an alternative to the use of the exhaust pipe 18 from the towing tractor, however, the embodiment shown in FIG. 2 employs a separate heater 34, which may be electric, bottled gas, or gasoline fueled to supply heated air to the connections to the air spaces 21 through center-connecting ducts 36, 37 and 38 in a recirculating manner. A separate heater 34 is employed for each of the trailers 32 in the embodiment shown in FIG. 2.

In both of the embodiments shown in FIGS. 1 and 2, the containers 16, with the dimensions given above, each are capable of holding a seven ton payload of HMA. Consequently, the single forty foot trailer 12 of FIG. 1 may be used to haul 28 tons of HMA material. The two trailers 32 of FIG. 2 each haul a payload of fourteen tons of HMA. In some states, a third trailer 32 may be used to haul an additional 14 tons of HMA with a single tractor 30.

When HMA is carried in the containers 16, transfer of each container 16 to a delivery vehicle is effected one at a time. The delivery vehicle may be any suitable smaller truck, capable of removing the container 16 and carrying it to the paver. Once the delivery truck reaches the paver, the HMA is dumped into the paver hopper from the container 16, as described in greater detail later. The first container then is returned to the opposite end of the trailer 12 (or 32), as described above, and the process is repeated. By using relatively small, seven-ton containers, the lighter weight delivery at the paver results in less damage to the subgrade and the area encroached on by the delivery vehicle. In addition, the smaller size container enhances placement of the HMA into the hopper of a paver by permitting the use of a more maneuverable delivery vehicle. This results in a lower HMA placement cost.

FIGS. 3, 4 and 5 show a typical container 16 used to deliver HMA to a job site by means of either the semi-trailer 12 or the trailers 32, shown in FIGS. 1 and 2, respectively. As shown in FIGS. 3, 4 and 5, the container 16 includes a double-walled inner shell or housing having a pair of spaced apart steel walls 40 and 42. The space between the walls 40 and 42 is developed by means of a network of 2 inch by 2 inch by 12 gauge square cross section steel tubing 44, arranged in a grid-like pattern between the walls 40 and 42. The distance between the different tubing sections 44 typically is between one foot and two feet to provide the desired structural integrity to the inner shell or inner housing of the container 16.

The container 16 has an aluminum outer shell 46, which covers both sides and the two ends, and a bottom 48. The space between the outer shell 46 and the bottom 48 and the inner shell 40/42 is filled with air or a suitable insulation 52. At the bottom, between the outer shell bottom 48 and the bottom of the double-walled inner shell 40/42, transverse and longitudinal support beams 49 carry the weight of the contents of the container 16. Rollers or wheels 57 and 59 are provided in the form of double wheel sets, consisting of inner and outer wheels and illustrated most clearly in FIG. 5, for facilitating the rolling of the containers 16 onto and off the trailers 12 and 32. The outer wheels roll on the steel main frame of the trailers. The inner wheels facilitate moving the container onto and off of a transfer frame on the truck 10 or 30, with the inner wheels rolling on top of an inverted channel for a guide on the top of the metal transfer frame.

The top of each container 16 is closed by insulated covers or lids 60 and 61, which split the top opening into two sections. The lids may be pivotally attached to the top of the container in any suitable manner or simply may be lifted out of a position over an opening in the top of the container and manually inserted back into that position. The manner in which these covers 60 and 61 are rotated or removed and subsequently placed back in the position shown in solid lines in FIG. 3 is not important; and this may be accomplished in any suitable manner. A preferred arrangement is to hinge the lid 60 at the top of the container at the forward inner wall so the lid 60 can swing open forward. The lid 61 then is hinged at the inner wall so it can swing open toward the rear of the container. All the sides are sloped and covered with rubber so each cover acts like a sealed cork when pressed tight, compressing the rubber on the top structure of the container. This makes the containers 16 sealed air and water tight. The top eight inches of the inner wall of the container 16 may be sloped to accommodate the sloped sides of the lids 60 and 61.

Each of the containers 16 has an opening located across the width of the rear at the bottom, which normally is closed (when the container is filled) by an insulated door 62. The door 62 is hinged at its upper edge by a hinge 64 and seals the opening in any suitable manner against the leakage of asphalt when the container 16 is being transported from one location to another, and when the container is being used to store HMA awaiting delivery to a paving hopper, or the like. The door 62 may be operated in any suitable manner. As illustrated, a pair of electric or hydraulic operating cylinders 65 each has an operating piston connected to a point 66 located on opposite sides of the door 62. In FIG. 3, the door 62 is shown in its closed, sealed position against the opening in the rear of the container; and in FIG. 4 the door 62 is shown in its open position. To facilitate the directing of HMA from the interior of the container 16 to the hopper of a paving machine, a lower lip or pan 68 extends outwardly from the bottom of the outer shell or housing 46 approximately two inches below the bottom of the inner shell 40. The lip 68 extends across the width of the container, as illustrated in FIGS. 3, 4 and 5. This lip 68 extends high over the paver hopper and well within the hopper to direct material flowing out of the container 16 into the hopper when the container 16 is being dumped.

FIG. 5 illustrates the manner in which the heated pipe 21 is located within the container 16, along the bottom corner or edge at each of the sides of the container 16. It is placed in a space formed by a curved plate 41, which is attached to, or is an extension of, the inner wall 40 of the inner shell or housing described above.

Figure 6B:
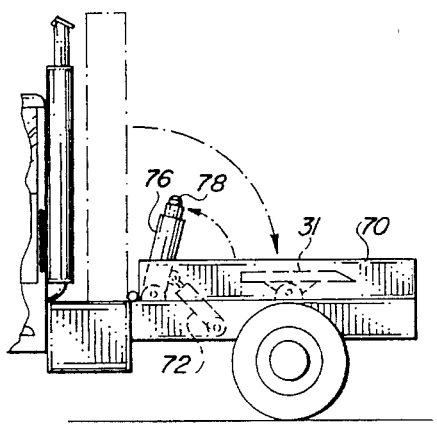
Figure 6C:
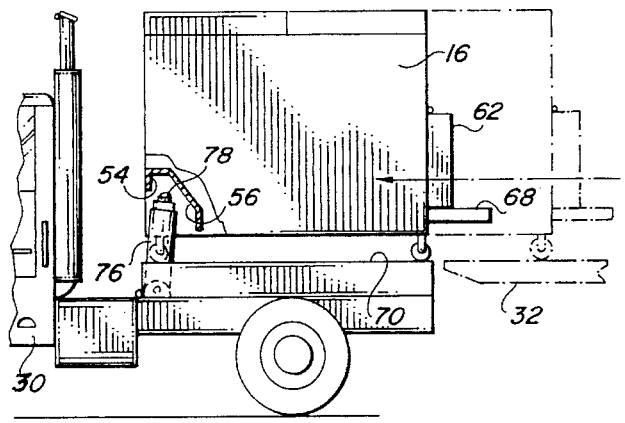
Figure 6D:
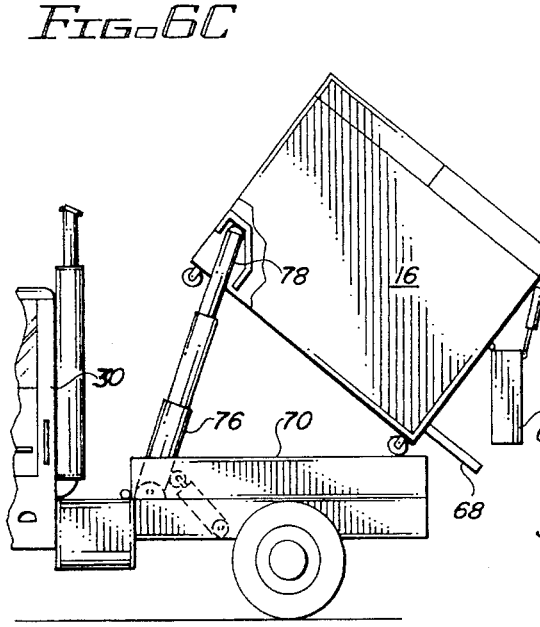

Reference now should be made to FIGS. 2, 6A through 6E and 7, which illustrate a feature of the transportation and delivery system. The tractor 30 shown in FIG. 2 includes an additional supplemental platform or transfer frame 70, which is rotated counterclockwise (as viewed in FIGS. 1 and 6A through 6E) to a vertical or storage position, as shown in FIGS. 2 and 6A. The platform 70 is moved or rotated between its vertical storage position, shown in FIG. 6A, to a horizontal use position, as shown in FIGS. 6B through 6D, by means of electronic or hydraulic pistons 72 located on each side of the platform 70 and attached to the frame of the towing tractor 30. When the fifth wheel 31 of the tractor 30 has been disconnected from the trailer 32 and the trailer is dollied or parked on its landing gear, the piston of the cylinder 72 is retracted to rotate the platform 70 in its clockwise direction to rest on the frame of the towing tractor 30. It should be noted that the platform 70 is open in its central area to accommodate the fifth wheel 31 by overlying or straddling the fifth wheel 31.

Once the platform 70 is in the position shown in FIG. 6B, a dump actuator device 76/78 is rotated in a counterclockwise direction, as shown in FIG. 6B, from its storage position, as shown in FIG. 6A, to ready the tractor 30 for receipt of a container 16 and delivery of that container to a paver hopper.

Figure 7:
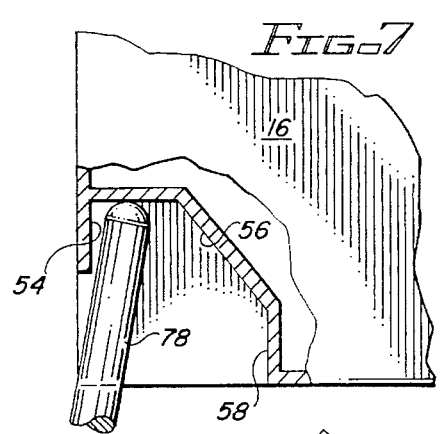
FIG. 7 is a detail of a portion of the operation of the embodiment shown in FIGS. 6B through 6E.

FIG. 6C shows the rolling of a container 16 from the front end of a trailer 32 onto the supplemental platform 70 to a position where the activator device 76/78 is located beneath a pocket 54/56/58 formed in the front of each container 16, shown most clearly in FIG. 3 and indicated in the partially cut away section of each of FIGS. 6C, 6D, 6E and 7. Once a container 16 is moved to the position shown in FIG. 6C, the actuator 76 is used to move an upper telescoping piston 78 into the pocket 54/56, as illustrated in FIG. 7. This serves to hold the container 16 in place; and the tractor 30 then is driven to a paver or other point of use where the container 16 is to be emptied.

When the container reaches the delivery point, the actuator 76 is further extended to the position shown in FIG. 6D. If this position is over a paver hopper, the door 62 on the rear of the container 16 is opened, as illustrated in FIG. 4, and the HMA contents pour out through the open door, over the lip 68 and into the paver hopper.

Figure 6E:
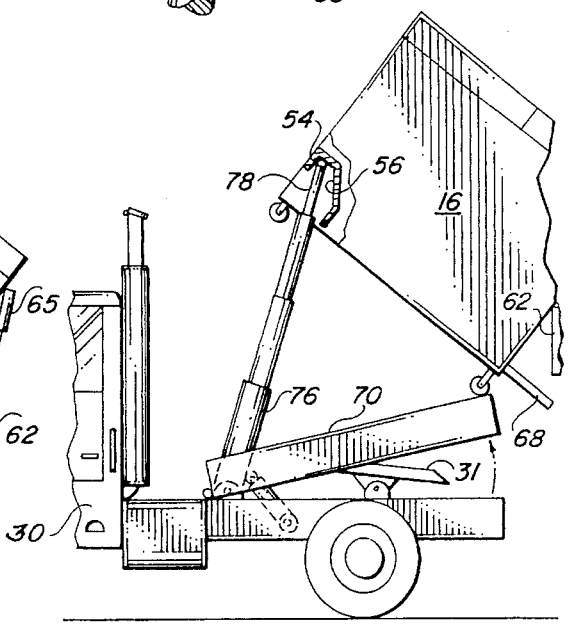

As illustrated in FIG. 6E, it may be desirable, for hoppers of different heights, to elevate the right-hand or rear end of the container 16 to an elevation which is above that which is illustrated in FIG. 6D. In such a situation, the cylinders 72 on opposite sides of the supplemental platform 70 are actuated to effect a partial rotation of the supplemental platform 70 from a horizontal position toward its vertical position, as illustrated in FIG. 6E. This then raises the right-hand end or the rear end of the container 16 to a height greater than that which is shown in FIG. 6D. Further extension of the actuator 76 then maintains a proper dumping angle for removing the HMA from the container.

After the HMA has been dumped from the container 16, the door 62 once again is closed, the actuator 78 is retracted, the container is returned to the position shown in FIG. 6C, and the container 16 then is rolled back onto the trailer 32, from the opposite end to permit withdrawal of the next container from the same trailer 32, from a different trailer 32, or from a longer semi-trailer, such as the trailer 12 shown in FIG. 1.

After all of the containers 16 have been dumped, the supplemental platform 70 is returned to the position shown in FIG. 6A and the actuator device 76/78 is rotated to its storage position, as shown in FIG. 6A. The tractor 30 then is ready to be used in a normal manner to tow the trailer 32 back to the HMA plant.

It should be noted that with the HMA transportation and delivery system, which has been shown in FIGS. 1 through 7 and described above, it is possible to deliver trailers 12 or 32 to a job site during low traffic times or off-peak hours. It is possible to deliver several units or trailers 12 or 32 to a job site and park the trailers at the site waiting to be unloaded. The heaters 34, shown in conjunction with the trailers 32, also may be used in conjunction with a larger semi-trailer 12 to circulate heated air through flues in the containers to maintain the heat of 250° to 300° of the HMA carried in the inner chamber of the insulated containers 16. It is possible that the containers 16 could be left at a job site for several days if necessary, so long as sufficient heat is provided by the heaters 34 to maintain the temperature of the HMA. If a long term storage of this type is employed, a small amount of inert gas may be injected into each container to expel any trapped air containing oxygen from the space between the covers 60 and 61 and the HMA located within the container.

It should be noted that the same tractor 10 or 30 may be used to deliver several trailers to a job site during off-peak hours, leaving one trailer at the job site and returning to pick up another. The next day, or whenever individual delivery of the HMA from the containers 16 to a paving machine is desired, one or two tractors 30 of the type shown and described in conjunction with FIGS. 6A through 6E may be used to remove, dump and return containers 16 to the various trailers 12 and 32, as desired. The result is a much more efficient operation than presently employed, where drivers of large dump trucks often wait in line to unload HMA from the truck into the paver prior to returning to the production plant. The quality of the delivered asphalt at the paver is significantly improved, even for "soft spot" areas, since the quality of the asphalt is not dependent upon the distance or delivery time, but is maintained by the container system in conjunction with the trailers and delivery system described.

The foregoing description of the preferred embodiments of the invention is to be considered illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A method for transporting and delivering hot mix asphalt (HMA) from a production plant to a utilization site including the steps of:

providing a trailer capable of being loaded and unloaded from either end with roll-on/roll-off containers;

placing at least one thermally insulated container filled with hot mix asphalt on said trailer from one of said ends;

towing said trailer to a destination location;

transferring each said at least one container from as said ends said trailer to a delivery vehicle;

emptying the hot mix asphalt from each said at least one container on said delivery vehicle; and returning each said at least one empty container to said trailer.

2. The method according to claim 1 wherein the step of transferring each said at least one container to said delivery vehicle comprises rolling each said at least one container from said trailer onto said delivery vehicle.

3. The method according to claim 2 further including the step of parking said trailer at said destination location following said step of towing.

4. The method according to claim 3 wherein each said at least one container is a double-walled insulated container.

5. The method according to claim 4 further including the step of providing supplemental heat to each said at least one container prior to removal of each said at least one container from said trailer.

6. The method according to claim 1 further including the step of parking said trailer at said destination location following said step of towing.

7. The method according to claim 1 further including the step of providing supplemental heat to each said at least one container prior to removal of each said at least one container from said trailer.

8. The method according to claim 7 wherein each said at least one container is a double-walled insulated container.

9. The method according to claim 1 wherein the step of transferring each said at least one container to said delivery vehicle comprises rolling each said at least one container from one end of said trailer onto said delivery vehicle, and said step of returning each said at least one empty container comprises rolling each said at least one container onto another end of said trailer.

10. The method according to claim 9 wherein each said at least one container is a double walled insulated container.

* * * * *